June 19, 1928.                W. WILLIAMS                1,674,538
                              GLARE SHIELD
                          Filed May 20, 1926
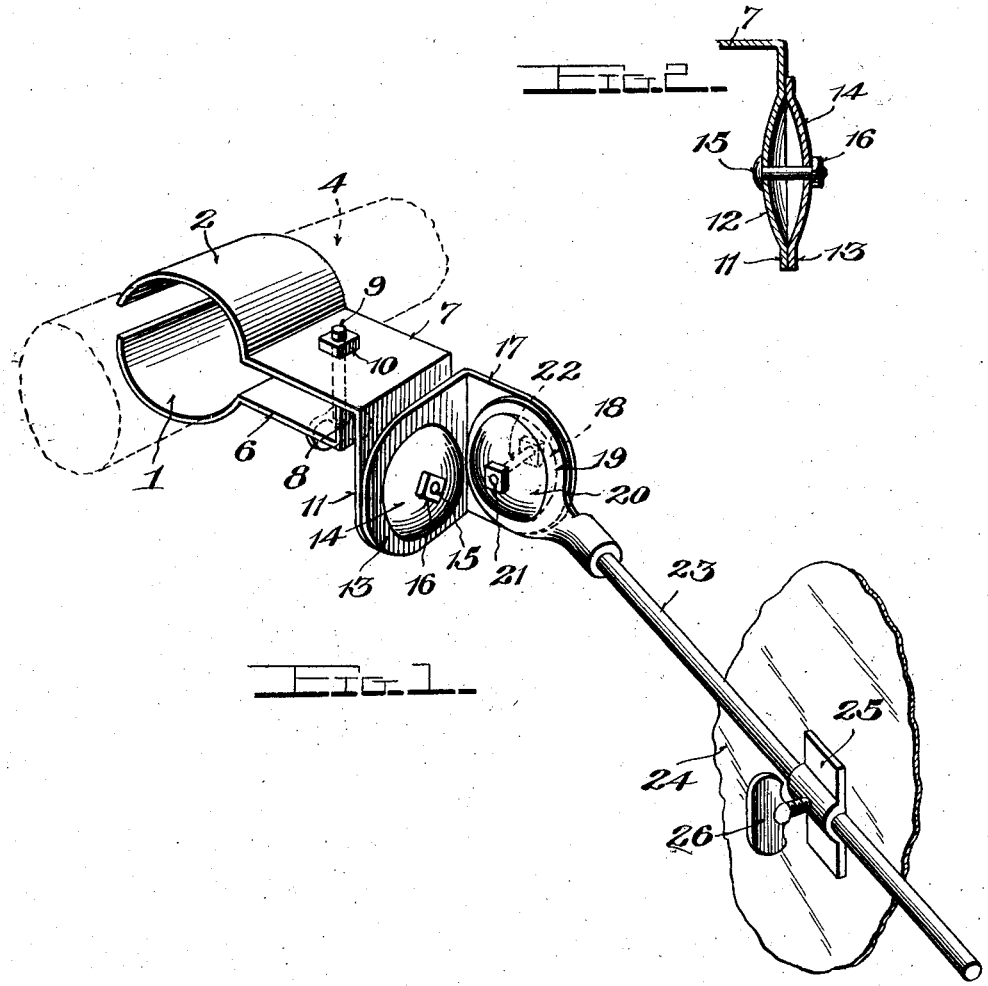
INVENTOR
Winfield Williams
John A. Naismith
ATTORNEY Patented June 19, 1928.

1,674,538

UNITED STATES PATENT OFFICE.

WINFIELD WILLIAMS, OF CENTERVILLE, CALIFORNIA.

GLARE SHIELD.

Application filed May 20, 1926. Serial No. 110,442.

This invention relates particularly to a shield mountable upon an automobile and movable into a position between the eyes and the objectionable glare.

It is one object of the invention to provide a device of the character indicated that may be readily mounted upon the framework of an automobile top, and that may be easily moved into any desired position relative to the eyes of the user.

It is another object of the invention to provide a device of the character indicated that is so constructed and arranged that the several movable parts will effectually maintain any position in which they may be placed.

It is also an object of the invention to provide a device of the character indicated that will be exceedingly simple in construction, economical to manufacture, quickly and easily assembled and arranged in position, and that will be strong, durable, and highly efficient in its practical application.

In the drawing:—

Figure 1 is a perspective view of a device embodying my invention, part being broken away.

Figure 2 is a section on line 2—2 of Figure 1.

Referring more particularly to the drawing, I show at 1 and 2 two portions of a clamp for mounting the device upon the bar 4 of an automobile top. The parts 1 and 2 are provided with plates 6 and 7 respectively held in spaced relation to each other by the bar 4 upon which the clamp is mounted and a flange 8 formed on plate 6 and bearing against the opposing face of plate 7 as shown. When a bolt as 9 is passed through the two plates and tightened up by means of the nut 10 the two plates are drawn together and the clamps 1 and 2 bound tightly to the bar 4.

Depending from the end of plate 7 remote from the bar 4 is a plate 11, this plate 11 being rigidly held in a vertical position by the clamping mechanism described and having a cupped portion 12 formed therein as clearly shown in Figure 2.

Another plate is shown at 13 having a cupped portion 14 formed therein and extending in the opposite direction to the cupped portion 12 in plate 11 and arranged in opposed relation thereto. While so positioned the two plates are secured together by means of a bolt 15 passed through the centers of their cupped portions and fitted with a nut 16 against which the outer end of the bolt is riveted.

The plate 13 is provided with a portion 17 arranged at right angles thereto as shown and this portion is formed with a cupped portion 18. At 19 is still another plate cupped as at 20 and secured to plate 13 as indicated at 21—22. This plate 19 carries a radially arranged rod 23 upon which is mounted a disc 24 by means of a bearing 25 and set screw 26.

The mounting of plate 13 on plate 11 and of plate 19 on plate 17, is such that sufficient friction is maintained between each two pairs of plates to hold them securely in any position in which one plate may be put relative to the other plate.

Since the plate 13 is revolubly mounted on the bolt 15 in plate 11 it may be readily turned through a full circle of three hundred and sixty degrees. Since plate 19 is revolubly mounted on bolt 22 in plate 17 it may be turned through an arc of greater than one hundred and eighty degrees. These two adjustments enables the user to place the rod 23 in any desirable position, and since the disc 24 is both revolubly and slidably mounted on the rod it may also be adjusted to secure desired protection from glare. To slide the disc on the rod 23 it is of course necessary to operate the set screw 26, but to rotate the disc a distance about the rod it is not usually necessary to loosen the screw at all.

With this device properly assembled and mounted upon the framework of the top of an automobile the user may by a simple movement shove it up entirely out of the way or move it about to keep the disc between his eyes and the source of the glare. This device is particularly useful when driving toward the sun in the early morning or late afternoon.

It is to be understood, of course, that while I have herein shown and described but one specific embodiment of the invention, changes in form, construction and method of operation may be made within the scope of the appended claims.

I claim:—

1. In a glareshield, a clamp composed of opposed jaws having outer ends formed to engage the top bar of an automobile top, the lower of the jaws having its inner end extending upwardly and engaged with the under face of the upper jaw, the inner end of the upper jaw extending downwardly over and below the said upwardly extending inner end of the lower jaw and being cupped, a fastener bolt extending through the jaws, a member of substantially L-form having each of its ends cupped and having one side engaged with the cupped end of the upper jaw, a cupped plate engaged with the other side of the L-member, fasteners extending through the adjacent cupped parts to adjustably connect same, a rod secured to the plate, a shield, a bearing on the shield turnably and slidably receiving the rod, and a screw to hold the rod in adjusted position.

2. In a glareshield, a clamp having a jaw one end of which is bent downwardly to lie in a vertical plane, a substantially L-shaped plate having one side thereof engaged with said part of the clamp, means to adjustably and pivotally secure said side of the plate to said part of the clamp, a second plate engaged with the other side of the L-shaped plate, means to adjustably and pivotally secure said second plate to said other side of the L-shaped plate, a rod secured to the second plate, a shield, a bearing on the shield turnably and slidably receiving the rod, and a screw to hold the rod fixed to the bearing.

3. In a glareshield, a clamp having a jaw one end of which is bent downwardly to lie in a vertical plane, and having a cupped part, a substantially L-shaped plate having a cupped part on each side thereof and having one of its sides engaged with said part of the clamp, a second plate engaged with the other side of the L-shaped plate, fasteners for adjustably and pivotally connecting the said sides of the L-shaped plate to the said part of the clamp and the second named plate respectively, a rod secured to the second named plate, a shield, a bearing on the shield to turnably and slidably receive the rod, and a screw to hold the rod fixed to the bearing.

WINFIELD WILLIAMS.